United States Patent [19]

Kolbow et al.

[11] 4,150,718

[45] Apr. 24, 1979

[54] REPLACEMENT THERMOSTAT ADAPTER WALL PLATE

[75] Inventors: Donald P. Kolbow, Minneapolis; John M. Whitney, Bloomington, both of Minn.

[73] Assignee: Honeywell Inc., Minneapolis, Minn.

[21] Appl. No.: 840,359

[22] Filed: Oct. 7, 1977

[51] Int. Cl.² .................. F25B 29/00; H01H 37/62
[52] U.S. Cl. .................................... 165/12; 165/26; 236/46 R; 337/301; 337/381
[58] Field of Search ............. 236/46 R, 1 R; 337/380, 337/381, 301; 339/32 R, 32 M; 165/12, 26

[56] References Cited

U.S. PATENT DOCUMENTS

| Re. 28,676 | 1/1976 | Edelman et al. | 236/68 B |
|---|---|---|---|
| 2,531,719 | 11/1950 | Alvino | 310/71 X |
| 2,874,317 | 2/1959 | Couse | 310/71 |
| 3,190,988 | 6/1965 | Graham et al. | 236/68 B |

Primary Examiner—William E. Wayner
Attorney, Agent, or Firm—Clyde C. Blinn; Henry L. Hanson

[57] ABSTRACT

An adapter wall plate for mounting a replacement thermostat on a wall wherein the adapter wall plate attaches to the existing wall plate of the thermostat being replaced thereby eliminating the necessity of disconnecting the wires leading from the existing wall plate to the remote control apparatus.

8 Claims, 7 Drawing Figures

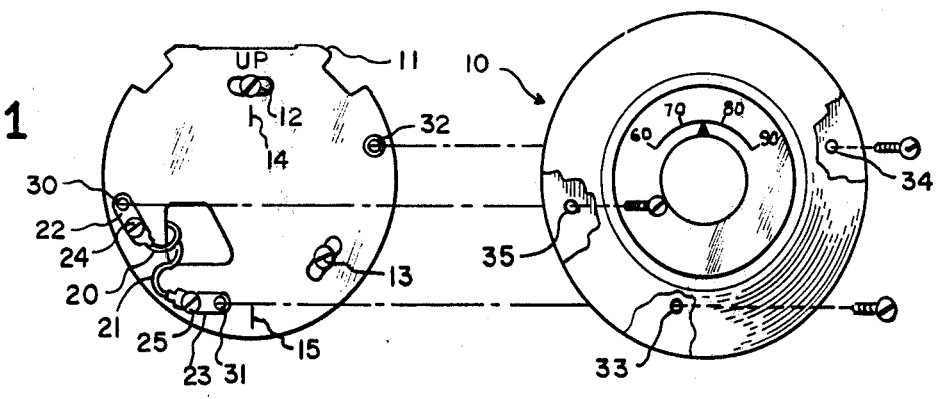
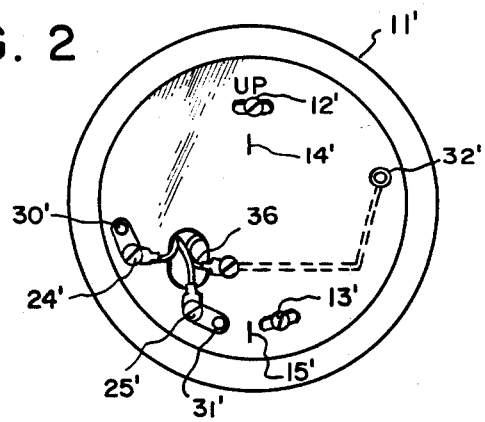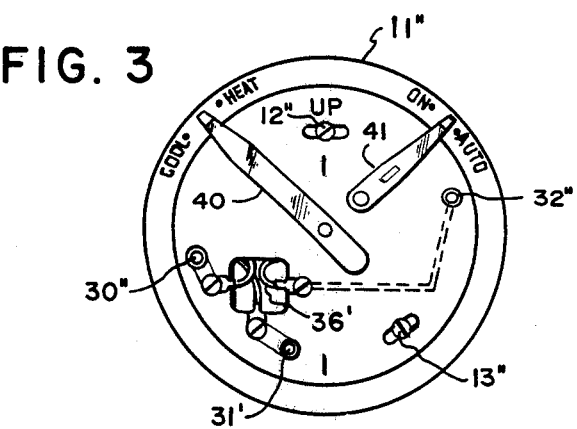
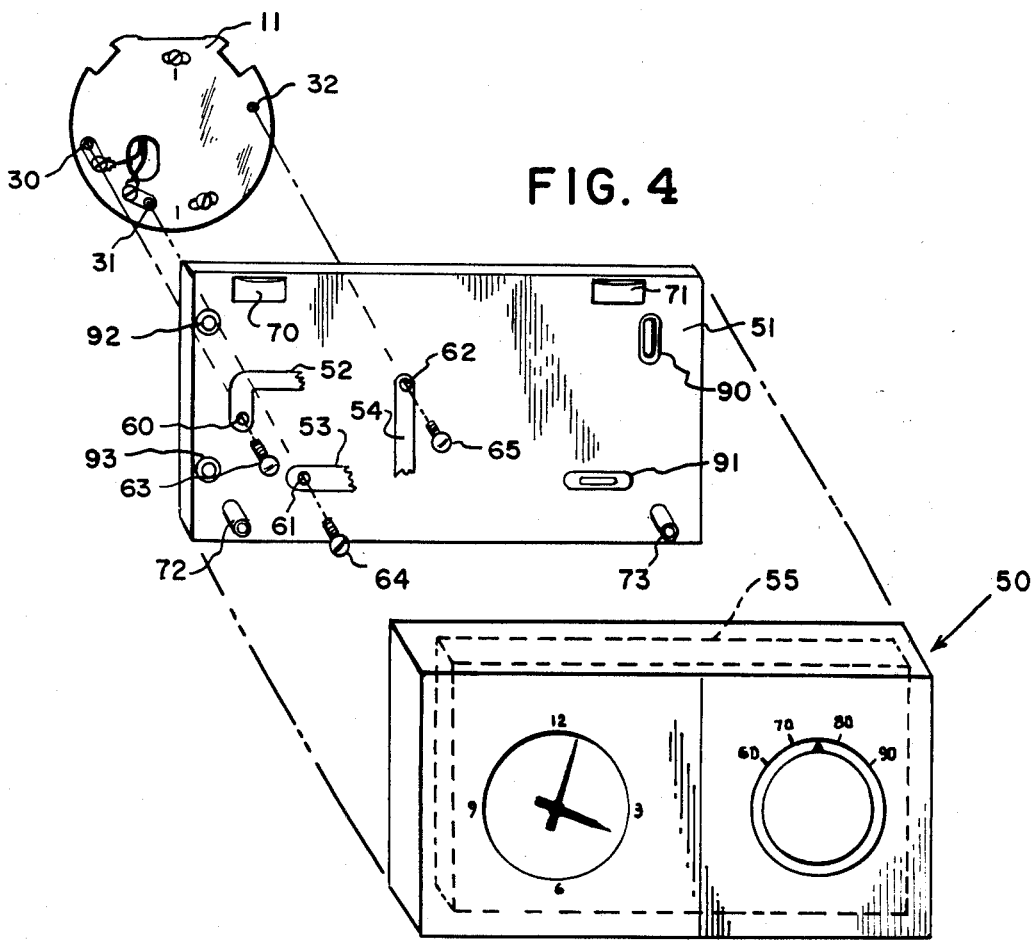

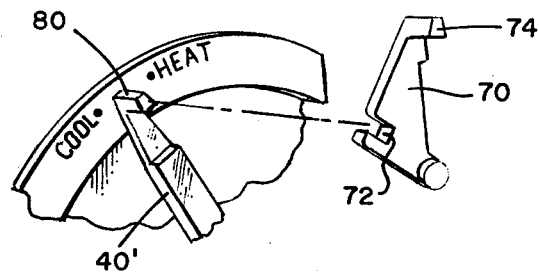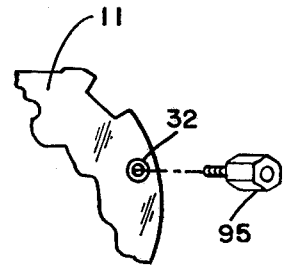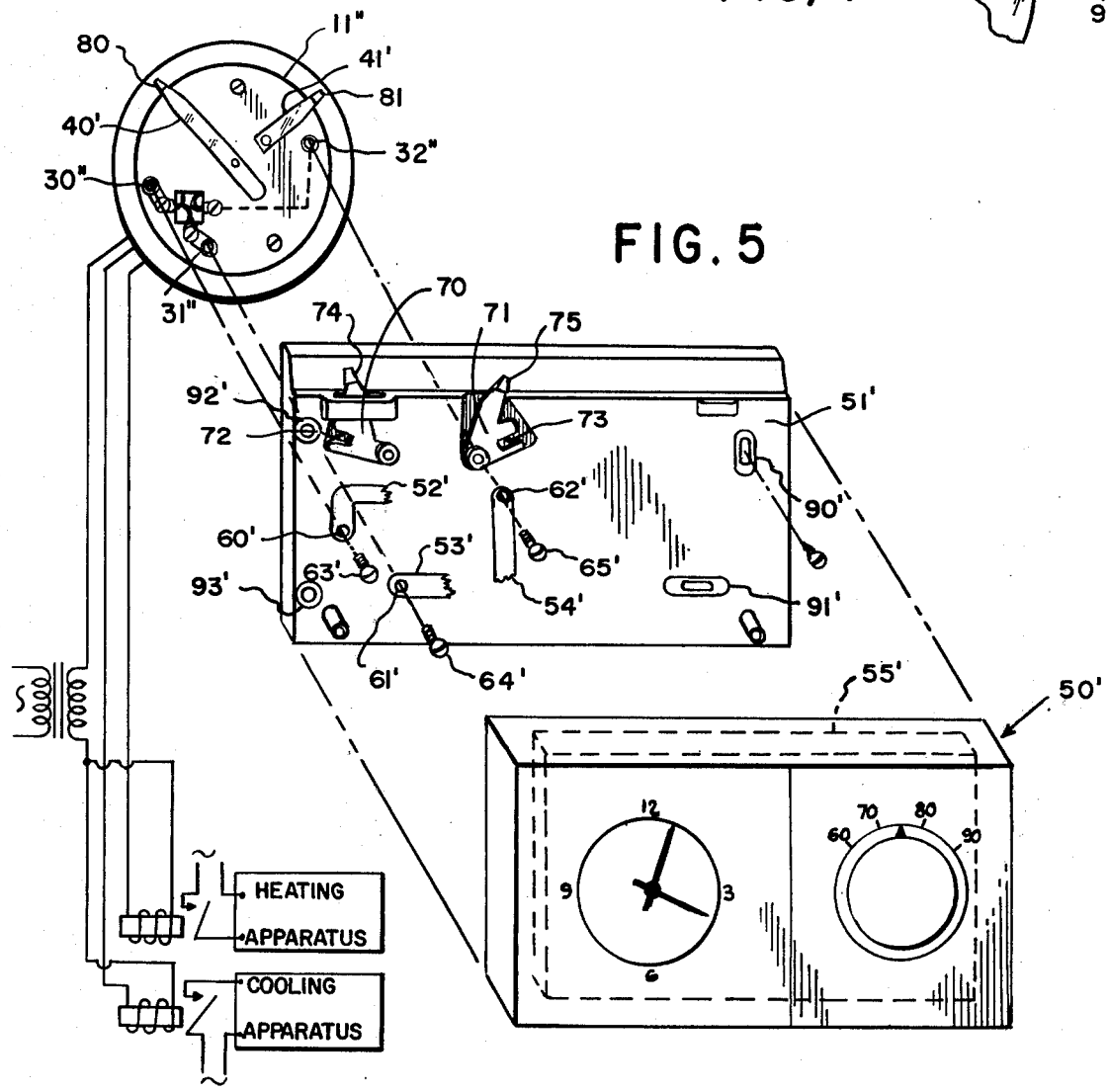

REPLACEMENT THERMOSTAT ADAPTER WALL PLATE

BACKGROUND AND SUMMARY OF THE INVENTION

A majority of the thermostats which are used for controlling heating and/or cooling in a dwelling or a home are mounted on the wall and wires are installed in the wall from the thermostat to remote control apparatus for the heating and cooling apparatus. In a majority of such wall thermostats, a wall plate or subbase is used to mount the thermostat on the wall. Such a wall plate generally has holes for receiving screws so that the plate can be attached to the wall in a level position. The plate has electrical terminals thereon for connecting at least two and possibly more wires from the remote control apparatus. The actual thermostat is then mounted on the wall plate by means of screws received by tapped holes in the wall plate. Certain of the screws either physically hold the thermostat on the wall plate and/or electrically connect the thermostat circuit to the terminals of the wall plate and thus to the remote control apparatus.

When a replacement thermostat is to be installed, whether it be a conventional thermostat or an electric clock thermostat of the type shown in the Carl G. Kronmiller U.S. Pat. No. 2,558,617 issued June 26, 1951, except that the electric clock is either powered by a manually wound spring or a rechargeable battery of the type manufactured by Honeywell Inc. having a type number T8084A DialSet Chronotherm thermostat and T8082A Fuel Saver Chronotherm thermostat, respectively, heretofore, the old thermostat and the wall plate in most cases were removed and the wires are disconnected from the terminals. A new wall plate which matches the replacement thermostat was then mounted on the wall by either screws or adhesive tape and the replacement thermostat was attached to the new wall plate. While the job of replacing a thermostat appears to be rather simple, such a replacement requires that the new wall plate be mounted in an exact level manner, that the wires from the remote control apparatus be connected to the proper terminals of the wall plate and that the replacement thermostat be properly handled and completely connected to the new wall plate. The possibility of an incorrect installation being made is great. Many "do-it-yourself" homeowners, as well as unskilled installers have difficulty in replacing an existing thermostat with a new thermostat when the replacement requires that the subbase of the existing thermostat be removed.

With the greater emphasis on energy conservation, the use of either spring or battery powered clock thermostats for heating and/or cooling systems in homes has increased and there is a sizeable commercial market for such clock thermostats. Obviously, the market will be greater if the replacement cost for such an electric clock thermostat can be kept at a minimum. One way of reducing the cost of the replacement of a thermostat is to make the replacement an easier job by eliminating as much of the difficulty which has heretofore been experienced.

The present invention provides for an adapter wall plate for a replacement thermostat which is mated for many of the wall plates and subbases of thermostats now in use. After the removal of the existing thermostat from its wall plate, the adapter wall plate of the new replacement thermostat is mounted over the existing wall plate and screws in the adapter wall plate are received into the same holes which were used for mounting the original thermostat. As the position of these holes is fixed, as the position of the replacement subbase is then established so that upon the mounting of the replacement thermostat on the adapter wall plate, a proper operation of the heating and/or cooling apparatus can be accomplished without the removal and reconnection of the electrical circuit.

The invention is described in the following specification in which

FIG. 1 is a showing of a conventional thermostat with a wall plate or base plate wherein the thermostat is connected by three screws to the wall plate, FIGS. 2 and 3 are other types of wall plates or subbases also only requiring a three screw connection for the thermostat, FIG. 4 is a showing of the replacement of an original thermostat by attaching an adapter wall plate on the old wall plate by inserting screws into the same screw holes used to support the original two or three wire thermostat, FIG. 5 is a view showing the replacement of an original multi-wire thermostat mounted on a wall plate as shown in FIG. 3.

FIG. 6 is an enlarged view of the interconnection of the system switch operator of the new subbase to the switch of the old subbase, and FIG. 7 shows spacers used with a wall plate.

DESCRIPTION OF THE INVENTION

Many thermostats of the type shown in FIG. 1 are presently installed in homes for controlling heating apparatuses. Thermostat or already existing condition responsive device 10 such as shown in the Carl G. Kronmiller U.S. Pat. No. 2,729,719 issued June 26, 1951 and the Walter E. Edelman et al U.S. Pat. No. 28,676 issued Jan. 13, 1976, is mounted on a wall in a room or space of a dwelling by means of a wall plate, base plate or subbase 11 which is attached to the wall either by a pair of screws 12 and 13 placed in holes through the plate 11 or by means of some adhesive means or tape (not shown) to hold plate 11 to the wall. At the time the plate 11 is mounted, the plate is oriented of plumbed to insure that the thermostat is level for proper operation. To assist the installer, lines 14 and 15 on the plate 11 are oriented to the vertical before screws 12 and 13 are tightened. Wires 20 and 21 were previously pulled through the wall from associated condition control or heating and/or cooling apparatus such as that disclosed in the mentioned Edelman et al patent. Terminals 22 and 23 on plate 11 have connection means such as screws 24 and 25, respectively, for connecting the wires 20 and 21 to the terminals. The terminals also have tapped holes 30 and 31 and the base has a third tapped hole 32; so that, when the thermostat 10 is mounted on the plate 11 and attached to the plate by means of screws through the holes 33, 34 and 35 of the thermostat, the thermostat is not only physically connected to the wall plate in a properly oriented position but electrically connected to the wires 20 and 21 for operating the remote control apparatus.

Other types of bases having a similar arrangement of connecting terminals are shown in FIGS. 2 and 3. These wall plates may have an additional wire such as wire 36 connected to a terminal at 32' to provide for the control of heating and cooling apparatus when the wall plates of FIGS. 2 and 3 are used as described in the mentioned Edelman et al patent. Switch operating levers 40 and 41 on subbase 11" shown in FIG. 3 are to control the type of system of the thermostat where heating or cooling is controlled and the system is no part of the present invention.

When thermostat 10 is used on any one of the subbases of FIGS. 1, 2 and 3, its replacement by a condition responsive device or clock thermostat whether powered by a spring or battery heretofore involved in the disconnection of the wires to the wall plate and the replacement of the wall plate by another wall plate usable with an electric clock thermostat. Referring to FIG. 4, an electric clock thermostat 50 is shown. The operation of such a thermostat is similar to that of the Kronmiller patent. Thermostat 50 has a wall plate or base plate 51 which has electrical circuit members 52, 53 and 54 associated with the mechanism 55 (not shown) of the electric clock thermostat. The spacing for the holes 60, 61 and 62 made in the electrical circuit members 52, 53 and 54, respectively, are such that when plate 51 is placed over the previously mounted wall plate 11 the holes align with holes 30, 31 and 32. When screws 63, 64 and 65 are used, wall plate 51 is electrically connected to the wires 20 and 21 of the control circuit. The orientation of wall plate 51 is established by leveling and securing to the wall with screws in mounting holes 90, 91, 92 and 93 to provide for the proper mounting of the thermostat 50 when mounted on plate 51 by some appropriate fastening means such as slots 70 and 71 and screws received by posts 72 and 73.

Similarly, as shown in FIG. 5, a thermostat 50' which might be for a heating and cooling apparatus has a subbase 51' which could be connected to wall plates 11' and 11" shown in FIGS. 2 and 3 where three wires are connected to the control system. For explanation purposes a wall plate 11" shown in FIG. 3 is selected. When the wall plate 51' is placed on the subbase 11", the holes 30", 31", 32", 60', 61' and 62' align, so that screws 63', 64' and 65' connect the electrical connections of the base to the wires of the subbase 11". When thermostat 50' is placed on the subbase 51', the remote electric clock conditioning apparatus operates under the control of thermostat 50'.

System switches 40' and 41' of the subbase which control the operation of the heating and/or cooling system as shown in the Edelman et al patent and as shown in FIG. 3 as well as that shown in FIG. 5, would be covered by the new base 51'. Switch operating members 70 and 71 are pivotally mounted on base 55' of FIG. 5 and each is adapted to receive the end of switch operating levers 40' and 41' of the subbase 11". Specifically, notches 72 and 73 receive the ends 80 and 81 of levers 40' and 41' so that upon operation of the system switch by moving the extension 74 and 75, the system switches of the subbase 11" (not shown) would be operated. The detail of member 70 which is similar to member 71, is more clearly described in FIG. 6 wherein notch 72 receives the outer extension 80 of switch lever 40' so that when lever 70 is moved with respect to its pivot by the knob 74, switch operating lever 40 is operated.

When the adapter wall plate 55 is used on wall plate 11, a spacer 95 as shown in FIG. 7 may be necessary for one or more of the screw connections at 30, 31 and 32.

USE AND OPERATION OF THE INVENTION

With the numerous existing wall plates or subbases 11, 11' and 11" as shown in FIGS. 1, 2 and 3, wherein thermostats of the type shown as 10 in FIG. 1 are presently used to control heating and/or cooling apparatus, and the replacement of the thermostat 10 by a clock thermostat 50 as shown in FIG. 4 is desired, the ease of replacement by eliminating any error in the electrical connection is important. The removal of the original thermostat 10 and mounting a second wall plate or subbase 51 on the existing wall plate provides that its electrical connections are made.

The embodiments of the invention in which an exclusive property or right is claimed are defined as follows:

1. In an adpater wall plate for a second condition responsive device, the adapter wall plate being adapted to attach to a wall plate of an already existing condition responsive device which has means for mechanically holding said existing device and a circuit electrically connecting said existing device to remote condition control apparatus so that with said adapter wall plate, said second condition responsive device can replace the already existing condition responsive device without the removal of connection wires from the wall plate to the remote condition control apparatus and the connection of the second condition responsive device is made by attaching the adapter wall plate to the wall plate, a support member adapted to support the second condition responsive device in an operative manner, circuit means on said support member, said circuit means being adapted to be connected to the second condition responsive device, and connection means adapted for connecting said support member and said circuit means to a wall plate from which an already existing condition responsive device has been removed so that said support member is mechanically held and said circuit means is properly connected to a circuit means of the wall plate to provide for proper operation of the remote condition control apparatus by the second condition responsive device.

2. The invention of claim 1 wherein, said second condition responsive device is a thermostat responsive to the temperature of the air in the area where the thermostat is located, said existing condition responsive device is a thermostat responsive to the temperature of the air in the area where the thermostat is located, and said condition control apparatus is heating and/or cooling apparatus.

3. An adapter wall plate for a clock thermostat comprising a wall plate member to which a clock thermostat is attached to physically hold the clock thermostat and to provide an electrical connection for said clock thermostat, and three screw connection means attached to said wall plate member and being associated with said electrical connection, said screw terminal means being spaced and adapted to be received by cooperating connection means of a conventional thermostat wall plate whereby the replacement of a conventional thermostat for a clock thermostat can be made by removing the conventional thermostat from its wall plate and mounting said wall plate member on the wall plate of the conventional thermostat by said three screw connection means to not require the removal of connection wires from the wall plate of said conventional thermostat.

4. In a method of replacing a clock thermostat for a conventional thermostat which is mounted on a wall by a wall plate which is physically attached to the wall and electrically connected to remote control apparatus by wires attached to electrical terminals on the wall plate, the conventional thermostat has mounting screws which are received by tapped holes in the terminals of the wall plate to electrically connect said thermostat to said terminals and thus the remote control apparatus and to physically hold the thermostat on said wall plate, comprising the following steps, removing the conventional thermostat from its wall plate by loosening the connecting screws, installing a second wall plate over the wall plate of the conventional thermostat, fastening the second wall plate to the wall plate of the conventional thermostat by screws received by the tapped holes in the terminals to provide an electrical connection and a physical connection, and mounting a clock thermostat on the second wall plate which mechanically supports the clock thermostat and electrically connects the clock thermostat to the remote control apparatus.

5. An improvement to a combination comprising an existing thermostat is mounted on a wall plate attached to a wall for mechanically holding the thermostat in a properly oriented manner and for electrically connecting the thermostat to a remote control apparatus by wires in the wall connected to terminals on the wall plate, an adapter wall plate for mechanically holding a second thermostat and means for electrically connecting the second thermostat to a circuit means on the adapter wall plate, the improvement comprising means for connecting said circuit means of said adapter wall plate to said terminals of said wall plate by removing the existing thermostat and attaching said adapter wall plate to said wall plate.

6. In an adapter wall plate for an electric clock thermostat, said wall plate being adapted to be attached to a wall plate of a conventional thermostat having at least one system switch operating lever so that an electic clock thermostat can be easily replaced for a conventional thermostat without the removal of the thermostat system connection wires from the wall plate of the conventional thermostat as the connection of the clock thermostat is made by only attaching the adapter wall plate to the wall plate of the conventional thermostat, a support member, circuit means on said support member, connection means associated with said circuit means adapted to connect said clock thermostat to said circuit means when said clock thermostat is mounted on said support member, further connection means associated with said circuit means for connecting said circuit means to the system connection wires when the clock thermostat is mounted on said wall plate, a second system operating lever mounted on said support member, and means connecting said second system operating lever to said one switch operating lever when said adapter wall plate is mounted on said wall plate.

7. The invention of claim 2 wherein said second condition responsive device is a clock thermostat for resetting the temperature maintained in the space at certain predetermined time periods, said electric clock thermostat can be mounted by an unskilled person by only attaching said adapter wall plate to the wall plate of the existing thermostat.

8. The invention of claim 5 wherein said second thermostat is an electric clock thermostat, said means for connecting are screws which are received in the same holes in the wall plate of the existing thermostat whereby said screws provide the mechanical connection to hold said adapter wall plate on said wall plate and to electrically connect the circuit of said adapter wall plate to the terminals of said wall plate, and said electric clock thermostat is attached to said adapter wall plate.

* * * * *